No. 612,923. Patented Oct. 25, 1898.
H. M. BRITTAN.
ROPE GRIP AND PROPELLING DEVICE.
(Application filed June 14, 1898.)

(No Model.) 2 Sheets—Sheet 1.

Witnesses,

Inventor
Henry M. Brittan
By Dewey Strong & Co.
Attys

No. 612,923. Patented Oct. 25, 1898.
H. M. BRITTAN.
ROPE GRIP AND PROPELLING DEVICE.
(Application filed June 14, 1898.)
(No Model.) 2 Sheets—Sheet 2.

Witnesses,

Inventor,
Henry M. Brittan
By Dewey Strong Ko.
Atty

UNITED STATES PATENT OFFICE.

HENRY M. BRITTAN, OF SAN FRANCISCO, CALIFORNIA, ASSIGNOR TO THE WASHBURN & MOEN MANUFACTURING COMPANY, OF WORCESTER, MASSACHUSETTS.

ROPE GRIP AND PROPELLING DEVICE.

SPECIFICATION forming part of Letters Patent No. 612,923, dated October 25, 1898.

Application filed June 14, 1898. Serial No. 683,423. (No model.)

*To all whom it may concern:*

Be it known that I, HENRY M. BRITTAN, a citizen of the United States, residing in the city and county of San Francisco, State of California, have invented an Improvement in Rope Grip and Propelling Devices; and I hereby declare the following to be a full, clear, and exact description of the same.

My invention relates to an apparatus which is especially designed to apply propelling power to a rope by means of grips which will prevent the rope from slipping, said grips grasping the rope and holding it firmly during a portion of its travel, and then releasing it to allow it to continue its motion without impediment.

It consists, essentially, of grips mounted upon a flexible continuous chain with cams or ways so situated with relation to the chain as to press upon the gripping-jaws at certain points and close them together upon the rope, said cams being so arranged as to again release the rope when the proper point has been reached.

It also consists in a means for carrying any kinks or enlargement of the rope exterior to the grips, whereby they are prevented from injury.

It further comprises details of construction which will be more fully explained by reference to the accompanying drawings, in which—

Figure 1:
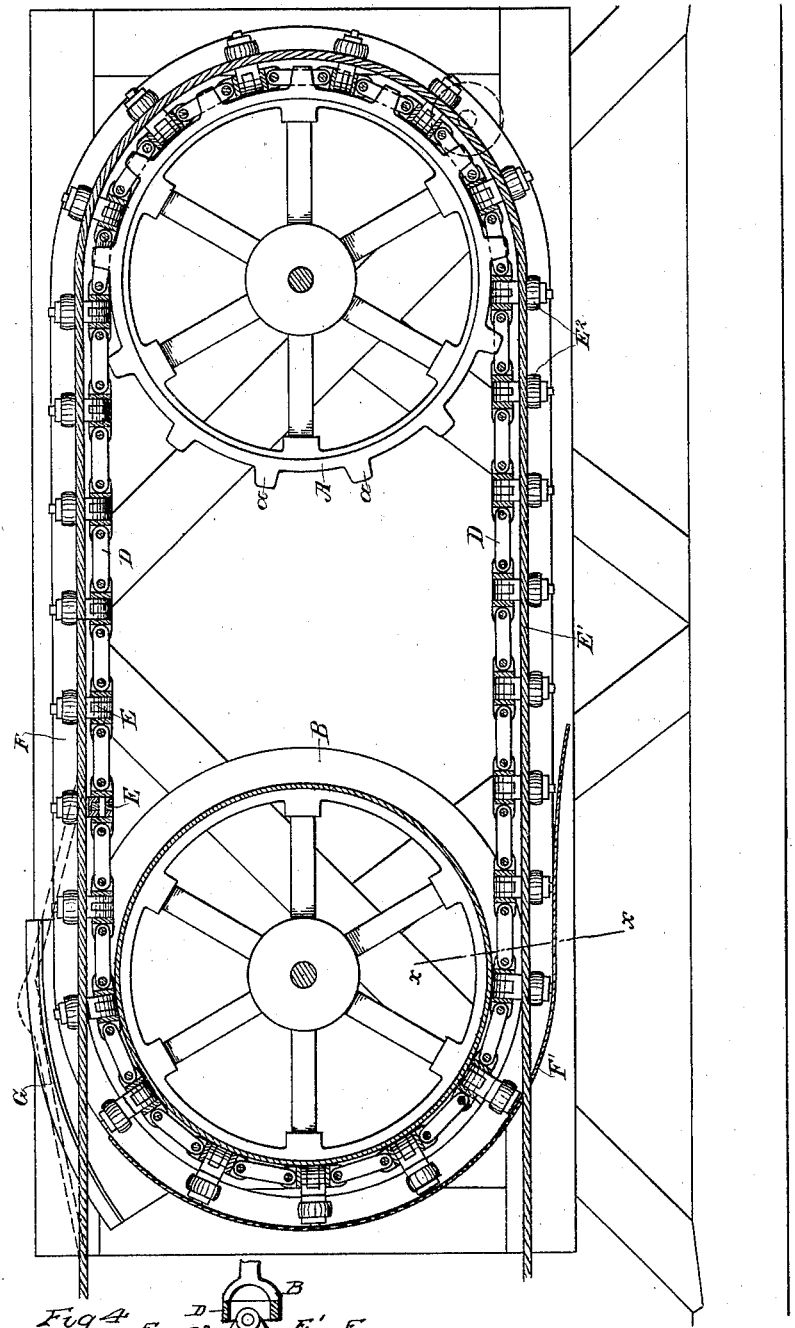
Figure 4:
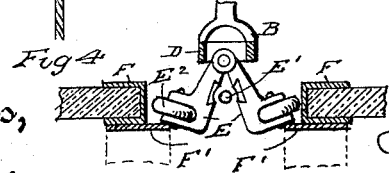
Figure 2:
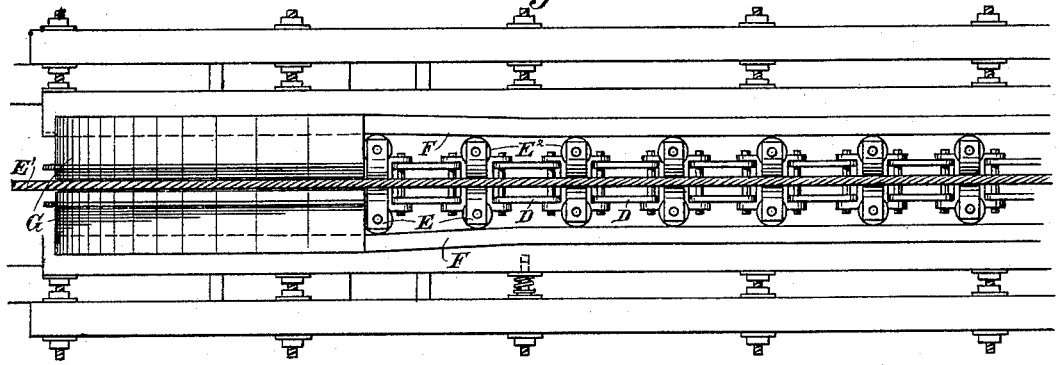
Figure 3:
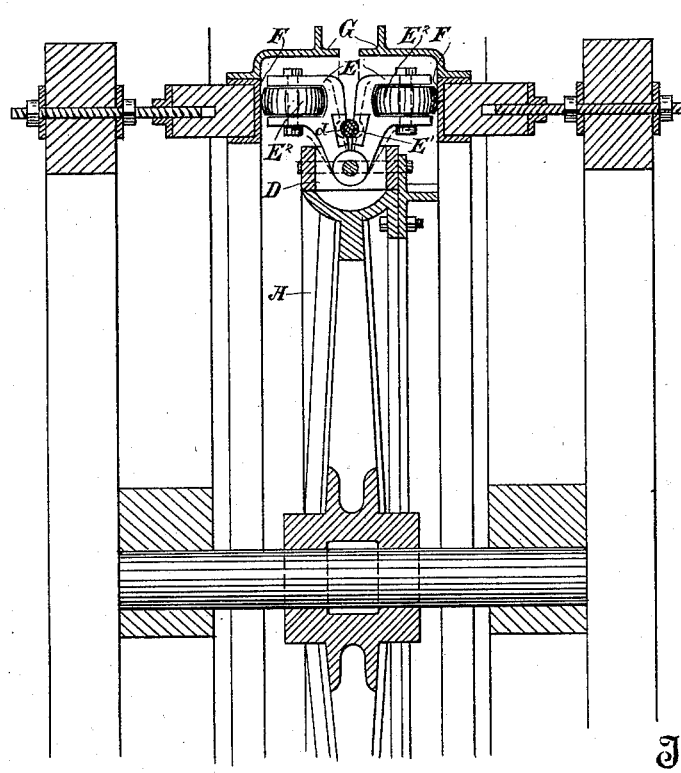

Figure 1 is a side elevation illustrating my invention. Fig. 2 is a plan view. Fig. 3 is a transverse section taken through wheel A. Fig. 4 is a cross-sectional view on the line $x\,x$ of Fig. 1.

The object of my invention is to provide a means for rope transmission, either endless rope passing around pulleys or rope that is to be transported from one point to another or where the rope is stationary and the grip is mounted upon a movable carriage; and it is designed to provide for any desired length of gripping mechanism without reference to the pulleys or wheels about which the rope may pass or by which it is carried.

In the usual form of grip-pulleys grips are arranged around the periphery of the pulley. It will be manifest that the grip can only take hold of the rope and maintain its hold upon the rope while the rope is passing around that portion of the pulley with which it contacts, and the grips must immediately let go to allow the rope to pass off the pulley tangent to the rim.

My device is designed to provide for any desired length of gripping-surfaces, whereby the rope may be held so as to prevent its slipping under any strain that can be brought upon it. In the present illustration I have shown wheels A and B. These wheels are of any suitable convenient diameter, and one at least of them has sprocket-teeth $a$, which are adapted to engage the links of a chain D, so that power being applied to the wheel A by a driving-pinion or other means this wheel will drive the endless chain which passes around it and the wheel B without any danger of slippage. Upon the links of the chain are mounted gripping-jaws E, which are fulcrumed together at their meeting ends or apex and diverge therefrom outwardly to allow the rope to freely enter between them. These jaws are preferably provided with clamp-dies $d$, and the semicircular depression in each is of such size as to fit and grip upon the rope or cable E', which passes between them.

The edges of the grip-jaws diverge outwardly, and their outer ends have antifriction bearing-surfaces of any suitable description. I prefer to make these bearings in the form of antifrictional rollers $E^2$, journaled in the outer ends of the jaws, as shown. In order to close these grips upon the ropes, I have shown ways F extending between the peripheries of the wheels A and B, which may be separated to any desired distance for this purpose. These ways diverge from each other upon each side of the wheel and converge toward the point where the grips enter between them, so that the grips passing between the ways are gradually closed upon the rope with as much force as may be necessary to hold and prevent slipping. It will be seen that all the grips which are between the parallel position of the main ways F will thus act to hold the rope, and, as before stated, there may be as many in number in operation as it is desired; but in order to permit the rope to continue its course it will be necessary to release it from the grips at a certain position. This is accomplished by diverging the main ways F again as the grips approach the second wheel B on their return, and the releasing is made positive by another set of ways F, so attached with relation to the main ways F as to actuate the diverged points of the grips and hold them in that position until they shall have reached the desired position to again take hold of the rope.

If it is only desired to transport a single rope from one point to another, it will be manifest that the grips should only act on the horizontal space between the wheels A and B. In this case the main ways F need not be extended much beyond the centers of the said wheels and have their diverging end at wheel B, as before, but the releasing-ways placed at wheel A.

In the application of my invention to stationary ropes and carriages or locomotives to be moved with relation thereto the wheels A and B, together with the grips and the gripping and releasing ways, would be attached to the locomotive, and its operation would be similar to that applied to a single line of rope—that is to say, the gripping would occur between the wheels A and B and not extend around either of the wheels, and the releasing would take place at wheel A.

The ways may be adjusted to or from each other by nuts and bolts from the exterior support, or the ways may be carried by arms and movable by springs or weights which normally press them toward each other, but which would allow them to separate for the passage of any obstruction which would otherwise injure them.

In many cases where ropes or cables are used for propelling purposes accidents are liable to occur, causing kinks or enlargements in the cable and of such size that if they were allowed to pass between the grips the latter or the guiding-ways would be injured because of their inability to compress the rope, which would also be spoiled by being crushed between the jaws. I have therefore shown a device by which any kinks or enlargements which are too great to safely pass through the grips will be turned outside and carried exterior to the grips. This device consists of a shield G, formed in two parts, the edges of which approach each other, and they are curved upwardly where the rope approaches the first of the line of grips, so as to extend above the ways between which the grips pass. The two parts of this guard or shield are sufficiently separated to allow all portions of the rope which are of normal size to pass between them; but any enlargement or kink will, when it strikes this shield, be carried upwardly above the line of travel of the grips and will ride outside of the grips instead of between them. As soon as the kinks have passed the shield sufficiently the cable will again drop into its place and pass between the grips.

Having thus described my invention, what I claim as new, and desire to secure by Letters Patent, is—

1. A rope-gripping device, consisting of a link chain, wheels around which said chain passes and through which motion is conveyed to it, gripping-jaws pivoted to the chain-links and carried by them, said jaws diverging to admit the rope between them, and having internal dies adapted to grip the rope, antifrictional bearings upon the outer ends of the grip-jaws, ways or guides between which these jaws pass and by which they are forced toward each other to grip the cable, said ways being convergent at the point where the grip enters and divergent to allow the grips to open and the ropes to pass out therefrom.

2. A rope gripping and propelling device, consisting of an endless chain formed of links, wheels around which the chain passes and through which power is applied to drive it, gripping-jaws fulcrumed to and carried by the chain-links, said jaws diverging outwardly to admit the rope, antifrictional bearings upon the outer ends of the jaws and ways between which the jaws pass to close them against the rope, said ways converging at the point where the grips enter between them and diverging allow the grips to open and the rope to escape at the point where it leaves them, and a device whereby the ways are adjusted to or from each other to increase the pressure upon the grips.

3. In a rope gripping and propelling apparatus, an endless chain, wheels around which it passes and through which motion is applied to propel it, grips fulcrumed in the chain-links, and ways between which the grips pass whereby they are closed upon the rope after the latter has entered between them, and a guard or shield at the point where the rope enters the grip whereby any kink or enlargement is diverted and carried exterior to the gripping-jaws.

4. In a rope-gripping apparatus, an endless chain, wheels around which it passes and through which propulsive motion is applied, ways between which the grips pass, and are closed upon the rope after the latter has entered between them, and supplemental ways acting to separate the grips after they have left the main ways.

In witness whereof I have hereunto set my hand.

HENRY M. BRITTAN.

Witnesses:
S. H. NOURSE,
GEO. H. STRONG.